United States Patent [19]

Scott et al.

[11] Patent Number: 4,956,410

[45] Date of Patent: Sep. 11, 1990

[54] BOUND ANTIOXIDANT MASTERBATCHES

[76] Inventors: Gerald Scott, 20 Gaia Lane, Lichfield, Staffordshire, England, WD13 7LW; Sahar Al-Malaika, 55 Monmouth Drive, Sutton Coldfield, England, B73 6JH; Abdul Ibrahim, c/o The University of Birmingham, Aston Triangle, Birmingham, England, B4 7ET

[21] Appl. No.: 377,753

[22] Filed: Jul. 7, 1989

Related U.S. Application Data

[63] Continuation of Ser. No. 170,961, Mar. 18, 1988, abandoned.

[30] Foreign Application Priority Data

Mar. 19, 1987 [GB] United Kingdom ............... 8706569

[51] Int. Cl.$^5$ ................. C08F 285/00; C08F 255/02; C08L 51/06
[52] U.S. Cl. ..................... 525/73; 525/279; 525/426; 523/351; 524/530
[58] Field of Search ............ 525/279, 73, 426; 523/351; 524/530

[56] References Cited

U.S. PATENT DOCUMENTS

| 3,705,166 | 12/1972 | Murayama | 546/242 |
| 3,862,265 | 1/1975 | Steinkamp | 525/279 |
| 4,032,592 | 6/1977 | Oglihara et al. | 260/827 |
| 4,659,796 | 4/1987 | Horie | 525/279 |
| 4,731,393 | 3/1988 | Karrer | 525/279 |
| 4,743,657 | 5/1988 | Rekers | 525/279 |

Primary Examiner—John C. Bleutge
Assistant Examiner—David Buttner
Attorney, Agent, or Firm—Nixon & Vanderhye

[57] ABSTRACT

A process for preparing a bound antioxidant polymer concentrate is described which comprises grafting one or more acrylic or alkylacrylic esters or amides containing a hindered-amine group onto the polymer in the presence of a radical generator at a temperature of 100° to 350° C., the molar ratio of said radical generator to said ester or amide being from 0.001: to 1:1, the reaction being continued for a time such that the melt viscosity of the polymer which increases initially during the reaction has reduced to a level which permits the concentrate to be homogeneously blended subsequently into a unstabilized polymer.

11 Claims, No Drawings

BOUND ANTIOXIDANT MASTERBATCHES

This is a continuation of application Ser. No. 07/170,961, filed Mar. 18, 1988, now abandoned.

This invention relates to bound antioxidant polymer masterbatches.

Many attempts have been made to produce non-volatile and non-extractable antioxidants and stabilisers by polymerising, co-polymerising or grafting of antioxidants containing polymerisable vinyl groups. Very few commercial products have been developed in spite of the large number of patents which have been obtained. The literature has been reviewed in Developments in Polymer Stabilisation-4(Ed.G. Scott) 1981, p.181, and ACS Symposium Series 280, 173 (1985).

The reasons for the lack of commercial success of the prior art are essentially:

(i) Homopolymerised antioxidants are incompatible with other polymers and consequently in general have low antioxidant activity.

(ii) Co-polymers of vinyl antioxidants and normal monomers, although oxidatively stable, are much more expensive to manufacture than the conventional large tonnage plastics such as polyethylene, polypropylene, polyvinylchloride and polystyrene since the scale of manufacture is much reduced. No new oxidatively stable plastics based on these monomers are believed to be in commercial use.

(iii) Grafting of vinyl antioxidants and stabilisers onto preformed polymers has been widely reported but, again, no commercial products have been produced since the efficiency of the chemical binding process is generally low and the products so produced are nol sufficiently effective to justify the cost of the modification procedure. Attempts to improve the efficiency of grafting hindered piperidine light stabilisers by increasing the number of grafting sites in the antioxidant and binding in the presence of a radical generator (EP-A-101,411), have again not been found to be commercially viable due to the need to introduce an extra stage into the polymer fabrication process. In addition there is considerable danger that the polymer will cross-link under these conditions.

The cost of modifying all the polymer substrate can in principle be avoided by carrying out the antioxidant grafting process in such a way as to produce a concentrated masterbatch of bound antioxidant which can subsequently be used as a normal additive for polymers during processing. This procedure has been used previously for thiol adducts to the double bond in rubbers, but is much more difficult to carry out on saturated polymers due to the inefficiency of the grafting process referred to above.

Surprisingly the inventors have found, according to the present invention, that hindered amine light stabilisers (HALS) containing an acryloyl or alkylacryloyl, typically methacryloyl, qroup can be reacted to give high concentrations of bound HALS in pol yolefins by melt processing in the presence of free radicals to give masterbatch concentrates (5–50 g/ HALS/100 g. of bound antioxidant polymer masterbatch concentrate) which can be used as normal additives; when the bound antioxidant masterbatch is diluted by normal polymer to the concentrations of the active ingredients normally used commercially, generally 0.01 to 5%, but preferably 0.1 to 1%, by weight, the resulting products have exceptional stability to light and heat. In some cases, substantially no unbound HALS can be removed from the polymer by exhaustive extraction. The grafted masterbatches are relatively cheap to produce and since they can be made at relatively high antioxidant loadings they are economical in use at the concentrations mentioned above.

According to the present invention there is provided a process for preparing a bound antioxidant polymer concentrate which comprises grafting one or more acrylic or alkylacrylic esters or amides containing a hindered-amine group onto the polymer in the presence of free radicals, at a temperature of 100o to 350oC, said free radicals being produced by shearing and/or by the presence of a radical generator in a molar ratio of said radical generator to said ester or amide of from 0.001:1 to 1:1, the reaction being continued for a time such that the melt viscosity of the polymer which increases initially during the reaction has reduced to a level which permits the concentrate to be homogeneously blended subsequently into the unstabilised(as hereinafter-defined)polymer.

The grafting procedure necessary is sensitive to the conditions used, these being very different from the conditions normally used in grafting. In particular the amounts of free radical generators or initiator added to the polymer are very much higher than those previously used. Concentrations of typical initiators such as peroxides as high as 5g/100g of polymer may be necessary to achieve the desired melt rheology of the masterbatch which makes it suitable for incorporation into unstabilised polymers; this would normally lead to complete degradation of the polymer under the high temperature conditions used during the melt reaction. The ratio of initiator to stabiliser is of crucial importance in producing a masterbatch which can be blended readily with normal polymer. If the ratio is too low, the masterbatch contains a high proportion of homopolymer (polyvinyl antioxidant) and is normally cross-linked and unprocessable. If the ratio is too high, molecular breakdown occurs to give low molecular weight material which may be less effective as a polymer bound masterbatch. Moreover, it is particularly necessary when the additive to be bound is di- or polyfunctional to increase the initiator to stabiliser ratio to obtain a product which can be blended with the host polymer. The preferred peroxide to vinyl HALS molar concentration ratio which has been found to give a satisfactory masterbatch in polypropylene at 20% antioxidant concentration is 0.001:1 to 1:1, preferably 0.004 or 0.005:1 to 0.5:1. At higher masterbatch concentration (e.g. 30–40 g/100g) the molar ratio range is preferably 0.005:1 to 0.05:1 whereas at lower concentration (e.g. 5–20g/100g, the molar ratio is preferably 0.002:1 to 0.01:1.

Alternatively, or additionally, free radicals can be introduced by shearing forces. As is well known shearing of a polymer during processing, for example in a high shearing mixer, introduces free radicals into the polymer. For very reactive polymers such as acrylonitrile-butadiene-styrene polymers shearing alone may be adequate, although increased binding can be achieved by using a radical generator as well. For more saturated polymers such as a polyethylene it will generally be necessary to use a radical generator.

It has been found that the temperature and time of processing the polymer in the presence of the stabiliser and free radicals are of considerable importance, particularly in the case of di- or polyvinyl compounds. The effect of time is illustrated for four different concentrations of antioxidant AATP (1-acryloyl-4-acryloyloxy-2,2,6,6-tetramethyl piperidine) in Table 1 below. There is an increase in the torque which indicates a polymerisation or cross-linking reaction at between 1 and 3 minutes. This is followed by depolymerisation (accelerated by peroxide and shear) to give a product in which the poly (vinyl-HALS) is chemically attached to the host polymer and which is capable of being melt blended with the normal polymer. Although homogeneous blending with the unstabilised polymer is required it will be appreciated that the concentrate can, if desired, be blended with other polymers. The reaction is normally continued for at least 6 min. to avoid the presence of substantial amounts of insoluble homopolymer and cross-linked polymer in the masterbatch. At lower temperatures the time may be longer and at higher temperatures shorter. At 150° C. the reaction is normally complete in 8 mins whereas at 180° C. it is normally complete in 4 mins. In general the time required will be from 2.5 to 10 minutes; although the upper limit is not critical it is unlikely to exceed 30 minutes. The temperature is not critical provided that it is above the melting point of the polymer and that the radical generator decomposes at a reasonable rate. The temperature will normally be at least 100° C.; the maximum temperature will depend on the stability of the radical generator and of the polymer. It will normally not exceed 350° C. Preferably it will be 150° C. to 250° C. The minimum temperature is governed principally by the processability of the polymer and the temperature at which the radical generator decomposes. The masterbatch can then be incorporated in the normal unstabilised polymer by simple liquid. By "normal or unstabilised polymer" as used herein, we mean not only a polymer to which no stabiliser has been added but also polymers which are sold commercially which although not said to be stabilised do in fact contain small amounts (generally <0.1%) of a melt stabiliser.

Under the conditions it has been found that most of the antioxidant is bound so that it cannot be removed and, in some instances, no measurable amount of antioxidant can be removed by continuous hot extraction by dichloromethane or acetone (in which AATP is very soluble) for 50h. By extracting with hot xylene in which the polypropylene adduct is soluble it was found that over 90% of the vinyl antioxidant had become chemically attached to the polymer (referred to as AATP-B*), the remaining 10% being present as dispersed oligomeric AATP which is insoluble in all solvents examined but is well dispersed in the polymer. Incorporation of poly AATP made by normal polymerisation led to a completely unbound HALS which is almost without activity as a UV stabiliser. Clearly the inability to remove any antioxidant from the final product is of great practical importance if it is to be used in a medical or food contexxt where toxicity has to be avoided or if there is the possibility of loss by evaooration or leaching or otherwise contaminating the human environment.

The antioxidants which can be used in this invention are acrylic or alkylacrylic esters and amides of hindered amines. One of skill in the art knows what is meant by a "hindered amine light stabiliser". Essentially the carbon atoms to the nitrogen in the light stabiliser must not have any hydrogen atoms attached thereto. Typical HALS are reviewed in "Polymer Stabilisation and Degradation" (ed. P. Klemchuk) ACS Symposium Series 280, 1984, chapters 2 to 4. In general the HALS are cyclic amines, for example piperidines, which are preferred, as well as other 6-membered, as well as 5- and 7-membered rings, optionally containing a further hetero atom such as oxygen, nitrogen or sulphur. The nature of any substituents in the ring is generally unimportant, provided, of course, that the compound contains at least one acryloyl or alkyl acryloyl group; examples of such substituents include alkyl, halogen, alkoxy and acyloxy. Typical compounds include those of formula:

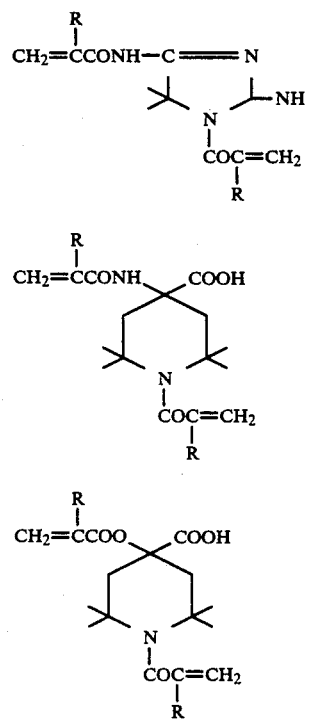

where R represents H or alkyl, especially $C_{1-4}$ alkyl and > represents dialkyl, especially dimethyl. Preferred stabilisers for use in the present invention are derived from the following structure by reaction with the appropriate derivative of acrylic or alkylacrylic acid:

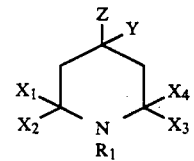

where Z represents H, OR, NHR, NR$_2$, COOH or CH$_2$COOH, each R, which can be the same or different, is H or alkyl, especially $C_{1-4}$ alkyl, $R_1$ represents hydrogen, alkyl, aralkyl, hydroxyl, alkoxy or aralkoxy, Y represents H, OH or NH$_2$ and $X_1$, $X_2$, $X_3$ and $X_4$ each independently represents alkyl, especially methyl. Typically the acryloyl group is reacted with Y as an ester or amide and may also be attached to the ring nitrogen atom (amide). AATP is particularly preferred. However any HALS containing an acrylate, acrylamide, alkylacrylate or alkylacrylamide can be used.

Typical examples are given below and their synthesis has been described previously (GB-A-1296245).

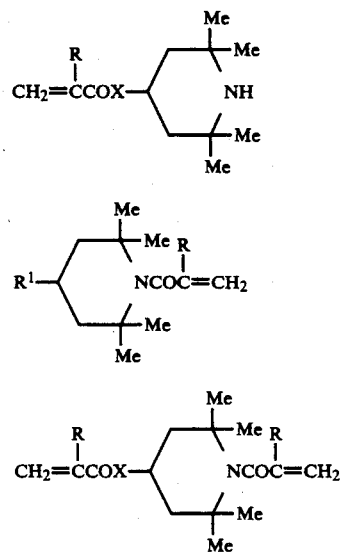

in which
X =—O— or —NH—, $R^1$=H, or a substituent, typically OR, NHR or $NR_2$ and R is as defined above.

The bis-acryloyl compounds III are preferred since the level of binding is generally substantially 100% leaving no unbound HALS in the final product.

The initiator may be any radical generator which produces radicals rapidly above 130° C. Dialkyl peroxides, diacyl peroxides and azo compounds are particularly suitable. Preferred compounds include dialkyl peroxides such as di-tertiary butyl peroxide, dicumyl peroxide, 2,5-dimethyl-di-(tert.butyl peroxy) hexane and diacyl peroxides such as dilauroyl peroxide as well as azo compounds such as azo bis-isobutyronitrile.

Although the HALS described in the prior art in general have a low level of thermal antioxidant activity (much lower than conventional thermal antioxidants, e.g. high molecular weight hindered phenols, such as 2,6-di.tert.butyl-4-methylphenol and 2,6-di.tert.butyl 4-$CH_2CH_2COOR$-phenols where R is a long chain alkyl radical e.g. $C_{18}H_{37}$ or $H(OCH_2)$- for polyolefins), and they do not synergise with thermal chain-breaking antioxidants, the vinyl HALS used in the present invention show a high level of thermal antioxidant activity and exceptional synergistic effects with conventional chain-breaking antioxidants such as the hindered phenols, for example 2,6-di-tert. butyl phenols, which can be incorporated during the synthesis of the bound HALS masterbatch. Even when the conventional antioxidant is only present as a small proportion in relation to the vinyl HALS, for example 2% by weight in relation to the vinyl HALS, (a much smaller amount than would be used normally to protect polyolefins against heat ageing but similar to that used in melt stabilisation) they show exceptional synergism and convert the bound hindered amines to very powerful thermal antioxidants. This is believed to be due to the development of polymer-bound nitroxyl radicals during the initial period of ageing. It is probably the latter and not the bound hindered amines themselves which are the effective thermal and photo antioxidants. The masterbatches of the present invention synergise effectively with conventional chain-breaking antioxidants whether added during masterbatch manufacture or subsequently when added to the polymer at concentrations typically of at least 2%, generally 10 to 250%, by weight based on the weight of the vinyl HALS.

It is also possible to incorporate UV stabilisers (UV screening agents), such as 2-hydroxy benzophenones and 2-hydroxy benzo-triazoles, especially 2-hydroxy-4-octyloxybenzophenone and 2-hydroxy-3,5di.tert.butyl benzotriazole, and again it is sometimes advantageous to incorporate the synergist(s) during the manufacture of the mast rbatch. Similar quantities to those for the chain-breaking antioxidants can generally be used although the minimum effective amount is likely to be 10% by weight. Other classes of antioxidants and stabilisers used in the prior art (see e.g. Polymer Degradation and Stabilisation, N. Grassie and G. Scott, Chapter 5), for example peroxide decomposers, metal deactivators and typical PVC stabilisers and synergists may also be used as synergists.

It is also possible to generate the nitroxyl radical in the masterbatch after grafting by subjecting the latter to oxidation. This can be done conveniently by exposing the hot melt to air at the end of the reaction. Alternatively the sam reaction can be carried out by adding a small molar proportion of a peroxide known from the literature to convert amine stabilisers to nitroxyl radicals. Examples include hydroperoxides and peracids such as tert. butyl hydroperoxide, cumene hydroperoxide and chloroperbenzoic acid. Typically the molar ratio of hydroperoxide or peracid to vinyl HALS is from 0.05:1 to 0.5:1, especially from 0.05:1 to 0.2:1. A combination of these techniques may be used. The products are effective thermal antioxidants and UV stabilisers even without synergists being present, but they also synergise with conventional antioxidants and stabilisers.

In general 2 to 50, especially 10 to 40,g of stabiliser will be incorporated in 100g of polymer in the masterbatch i.e. the bound antioxidant polymer masterbatch concentrate contains per 100 g of masterbatch concentrate from 2 to 50 g, especially 10 to 40 g, of bound stabilizer). Other polymers which may be used include the polyethylenes and other polyolefins, PVC, polystyrene, polyamides, ethylene propylene co and terpolymers, rubbermodified plastics (e.g. ABS), thermoplastic rubbers and the polyunsaturated rubbers (IR,SBR,BR, etc).

The following Examples further illustrate the present invention.

EXAMPLES 1-3

Unstabilised polypropylene was processed in a closed torque rheometer at 180° C with 5, 10 and 20g/100g of AATP and ditert-butyl peroxide (DTBP) at a molar ratio DTBP to AATP of 0.005. The change in applied torque in the mixer at intervals is shown in Table 1.

TABLE 1

| | Applied torque (arbitrary units) in polypropylene processed in a closed mixer at 180° C. | | | | | | | | | |
|---|---|---|---|---|---|---|---|---|---|---|
| Example | Masterbatch conc (g/100 g) | 0.5* | 1.0* | 1.5* | 2.0* | 2.5* | 3.0* | 4.0* | 6.0* | 10.0 |
| 1 | 5 | 5 | 6 | 5 | 4 | 3 | — | 3 | 2 | 2 |

TABLE 1-continued

| | | Applied torque (arbitrary units) in polypropylene processed in a closed mixer at 180° C. | | | | | | | | |
|---|---|---|---|---|---|---|---|---|---|---|
| Example | Masterbatch conc (g/100 g) | 0.5* | 1.0* | 1.5* | 2.0* | 2.5* | 3.0* | 4.0* | 6.0* | 10.0 |
| 2 | 10 | 7 | 5 | 4 | 6 | 4 | — | 3 | 3 | 2 |
| 3 | 20 | 5 | 3 | 5 | 11 | — | 6 | 4 | 4 | 3 |
| Control | 0 | 7 | 3 | 3 | 3 | 2 | 2 | 2 | 2 | |

*Processing time, min.

It will be noted that the initially high torque reduces as it does in a normal control sample without AATP, but there is a second increase in torque resulting from the formation of a high molecular weight, partially cross-linked polymer; this occurs at about 1, 2 and 2 minutes in Examples 1, 2 and 3 respectively. The value should be reduced to about 3 before it can be melt-blended satisfactorily with normal polymer. As can be seen this occurs after 2.5, 4 and 10 minutes, respectively.

EXAMPLES 4-6

Unstabilised polypropylene was processed in a closed mixer at 180° C. with 10 g/100 g of AATP and ditert-butyl peroxide DTBP at a molar ratio DTBP/AATP of 0.005 for 10 mins (Example 4). The product was comminuted and it was found that nothing could be extracted from the masterbatch by exhaustive extraction with acetone or dichloromethane. 4 g was added to 96 g of unstabilised polypropylene to give 0.4 g of bound AATP in the polymer and the mixture was processed normally at 180° C. in a closed mixer. Compression moulded films were found to embrittle in 1850 hours in an accelerated weathering cabinet.

Normal incorporation of AATP (Example 5) and poly AATP (Example 6) at 0.4 g/100 g give embrittlement times of 1700 h and 425 h respectively but the former was completely removed by extraction and gave 150 h after extraction. The unstabilised control gave 90 h.

EXAMPLES 7-8

AATP (Example 7) and the masterbatch from Example 4 (Example 8) were both incorporated into polypropylene (PP) by a normal processing procedure to give 2 g/100 g of stabiliser. The films were exposed to UV irradiation in an accelerated weathering cabinet and the concentration of the carbonyl ester absorption at 1725 cm$^1$ was followed at intervals. It was found that the concentration of AATP normally incorporated (Example 7) was reduced to 50% after 350 h exposure, whereas the bound AATP concentration (Example 8) remained almost unchanged.

EXAMPLE 9

A 10% masterbatch of bound AATP made by the process of Example 4 was exhaustively extracted with dichloromethane and was then added at 0.4% to polypropylene containing 0.04% of a commercial antioxidant, the octadecyl ester of 3(3$^{15l}$-ditert-butyl-4-hydroxy phenyl) propionate (Irganox 1076). The UV embrittlement time was 1800h. This shows the effectiveness of a masterbatch of this invention with a UV stabilised polymer to provide a light stable polymer. Clearly only completely bound AATP was present in the masterbatch showing the bound material is effective.

ExAMPLE 10

Example 9 was repeated except that the commercial antioxidant was replaced by 0.1% of a commercial UV absorber, 2-hydroxy-4-octyloxy benzophenone (Cyasorb UV531). The UV embrittlement time was 2050 h.

EXAMPLE 11

Example 9 was repeated except that the masterbatch was not extracted and 0.1% of Irganox 1076 was added to the polymer with the masterbatch. Films were aged in a circulating air oven at 140° C. The embrittlement time was 950 h The control without antioxidant gave an embrittlement time of 0.5 h (Example 12) and a sample containing 0.1% Irganox 1076 alone gave 95 h (Example 16). This demonstrates the resistance to thermal oxidation of a mixture of polymer with antioxidant.

EXAMPLES 12-23

Example 11 was repeated except that the amounts and ratios of AATP-B and Irganox 1076 were varied. The results are shown in Tab)e 2.

TABLE 2

| Synergism between AATP-B and Irganox 1076 in polypropylene in an air oven at 140° C. | | | |
|---|---|---|---|
| Example No. | AATP | 1076 | Embrittlement (h) |
| 12 | 0.2 | — | 0.5 |
| 13 | 0.2 | 0.02 | 50 |
| 14 | — | 0.02 | 5 |
| 15 | 0.2 | 0.1 | 650 |
| 16 | — | 0.1 | 95 |
| 17 | 0.2 | 0.2 | 750 |
| 18 | — | 0.2 | 160 |
| 19 | 0.4 | 0.2 | 1200 |
| 20 | 0.4 | 0.4 | 1300 |
| 21 | — | 0.4 | 260 |
| 22 | 0.4 | 1.0 | 1500 |
| 23 | — | 1.0 | 500 |

The synergistic effect between the AATP-B and Irganox 1076 is clearly apparent.

EXAMPLE 24

The process of Example 1 was repeated except that the total concentration of AATP was 20 g/100 g of polypropylene, the ratio of DCP to AATP being maintained at 0.005. The masterbatch was diluted to 0.4 g AATP/100 g polymer, 0.1 g/100 g of Cyasorb UV531 was added and the polymer was processed for 10 min at 180° C. Films made from this polymer on exposure to UV light embrittled at 2000 h.

This Example shows that a 20% masterbatch is as effective as a 10% masterbatch (see Example 10).

EXAMPLE 25

The 20% masterbatch of Example 24 was processed in PP at 180° C./6 min with 0.1 g/100 g Irganox 1076.

Films made from this formulation were still not brittle in an air oven at 140° C. after 900 h.

EXAMPLE 26

Example 25 was repeated except that the 20% masterbatch was reduced to 0.2 g/100 g in the polymer. Films made from this formulation embrittled in an air oven at 600 h.

EXAMPLE 27

A mixture of AATP (5g) and 4-acryloyloxy-2,2,6,6-tetramethyl piperidine (AOTP) (5 g) with 90 g of polypropylene (PP) were processed as in Example 4. Neither of the UV stabilisers could be extracted from the masterbatch. Films made by adding 1.4 g of the masterbatch to unstabilised polypropylene did not embrittle on exposure to UV up to 1000 hours whereas a control sample with no additive embrittled at 90 hours.

When AOTP was used alone (10 g with 90 g PP) in the above experiment, the antioxidant was found to be only 45% bound on extraction.

EXAMPLE 28

Example 27 was repeated using 2 g AATP and 8 g AOTP and again both antioxidants were found to be 100% bound to the polymer so that nothing could be extracted with either acetone or dichloromethane. When added as a masterbatch to unstabilised PP to give 0.2 g/100 g in the polymer, the UV embrittlement time was found to be 880 h. A commercial HALS, bis-2,2,6,6-tetramethyl-4-piperidyl-sebacate gave 625 h at the same concentration but this UV stabiliser was completely removed by extraction and embrittled in 100 h. When AOTP was used alone in the above experiment, it was found to be only 45% bound and embrittled at 550 h before extraction.

EXAMPLES 29-32

Example 28 was repeated and the masterbatch was diluted to 0.4 g/100 g in PP together with other synergistic additives as indicated in Table 1 and the resulting films were tested by heating in a forced air oven at 140° C. and by exposure in a UV cabinet

TABLE 1

| Example | Synergist | Conc$^n$ g/100 g | Embrittlement time, h Thermal | UV |
|---|---|---|---|---|
| 29 | — | — | 11.5 | 1450 |
| 30 | Irganox 1076 | 0.04 | 480 | 1870 |
| 31 | " | 0.1 | 750 | 1115 |
| 32 | UV 531 | 0.1 | — | 2200 |

The following controls were carried out without polymer-bound hindered piperidines

| No additive | — | 0.5 | 90 |
|---|---|---|---|
| Irganox 1076 | 0.1 | 54 | 180 |
| UV 531 | 0.1 | — | 330 |
| Tinuvin 770 | 0.4 | 0.5 | 1400 |

On solvent extraction the conventional stabilisers lost almost all their activity.

EXAMPLE 33

10 g of AATP was mixed with unstabilised LDPE pellets and was processed with di-tert butyl peroxide (at 0.005:1 molar ratio) at 150° C./10 mins. No UV stabiliser could be extracted from the masterbatch by CH$_2$Cl$_2$ or acetone. The masterbatch was added to unstabilised LDPE to give 0.4 g/100 g of oolymer. After processing at 150° C. and compression moulding, the polymer film was exposed to an accelerated weathering test at 35° C. (S/B cabinet). The polymer had not embrittled after 4000 hours, whereas the control embrittled at 1100 hours.

EXAMPLE 34

2 g of AATP and 8 g of AOTP were processed in commercial ABS in a high shear closed mixer at 180° C. for 5 min (rotor speed 60 rpm). The resulting concentrate was diluted in commercial ABS to give 1 g/100 g in the polymer. Extraction of the polymer film showed that less than 5% of the stabiliser could be extracted in refluxing hexane in 12 hours and no further change occurred after that time.

EXAMPLE 35

Example 34 was repeated using, in addition, a commercial bis dialkyl peroxide (Triganox) at a molar ratio 0.001 mole per mole of acryloyl compounds. The above procedure showed the sample to be 100% bound to the polymer.

EXAMPLES 36 and 37

The products of Examples 34 and 35 were exposed to UV light in an accelerated exposure cabinet. In both cases the time to embrittlement was >250 hours whereas the use of a commercial hindered piperidine, Tinuvin 770 at the same concentration gave only 80 hours.

EXAMPLE 38

The product of Example 34 was added to unstabilised ABS at a concentration of 0.5/100 g together with a commercial UV absorber, Tinuvin P at 0.5 g/100 g. The sample did not embrittle within 500 hours.

We claim:

1. A process for preparing a bound antioxidant polymer masterbatch concentrate which comprises grafting at least one antioxidant selected from bis-acrylic esters, bis-alkylacrylic esters, bis-acrylic amides, and bis-alkylacrylic amides having the structure

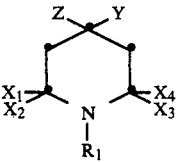

where Y represents

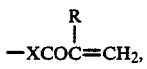

$R_1$ represents

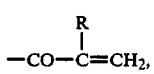

Z represents H, OR, NHR, NR$_2$, COOH or CH$_2$COOH, each R, which can be the same or different, represnts H or alkyl, X represents —O— or —NH—, and each of $X_1$, $X_2$, $X_3$ and $X_4$, which can be the same or different, represents alkyl, onto a polymer selected from the group consisting of polyolefins, vinyl chloride polymers, polystyrene, polyamides, ethylene-propylene copolymers and terpolymers, rubber-modified plastics, thermoplastic rubbers and polyunsaturated rubbers, in an amount sufficient to provide from 2 to 50 grams of anitoxidant per 100 g of bound antioxidant polymer masterbatch concentrate by reaction in the melt in the presence of free radicals at a temperature of 100° C. to 350° C., said free radicals being produced by shearing and/or by the presence of a radical generator in a molar ratio of said radical generator to said antioxidant of from 0.001:1 to 1:1, the reaction being continued whilst continuing to shear the melt for a time such that the melt viscosity of the polymer which increases initially during the reaction has reduced to a level which permits the concentrate to be homogeneously blended subsequently into unstabilised polymer.

2. A process according to claim 1 in which the molar ratio of said radical generator to said ester or amide is from 0.002:1 to 0.01:1.

3. A process according to cliam 1 which is carried out a temperature of 150° C. to 250° C. for 2.5 to 10 minutes.

4. A process according to claim 1 in which the radical generator is a dialkyl peroxide, a diacyl peroxide or an azo compound.

5. A process according to claim 1 in which a chain-breaking antioxidant or UV stabilizer is incorporated into the concentrate at a concentration from 10 to 250% by weight based on the weight of the ester or amide during the production of the concentrate or subsequently.

6. A process according to claim 1 in which the concentrate is subjected to oxidation by exposing the concentrate while still in the melt to air and/or peroxidic oxidising agent.

7. A process according to claim 1 in which the polymer is a polyolefin.

8. A process according to claim 1 inwhich grafting is carried out in the presence of a second antioxidant selected from mono-acrylic esters, monop-alkylacrylic esters, mono-acrylic amides, and mono-acrylic amides having the structure

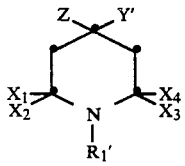

where either Y' represents

and $R_1''$ represents hydrogen, alkyl, aralkyl, hydroxyl, alkoxy or aralkoxy or Y' represents H, OH or $NH_2$ and $R_1'$ represents

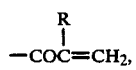

Z represents H, OR, $NR_2$, COOH or $CH_2COOH$, each R, which can be the same or different, represents H or alkyl, X represents —O— or —NH—, and each of $X_1$, $X_2$, $X_3$ and $X_4$, which can be the same or different, represents alkyl.

9. Process according to claim 1 in which the polymer is selected from the group consisting of polyolefins, vinyl chloride polymers, polystyrene, ethylene-propylene copolymers and terpolymers, rubber-modified plastics, thermoplasic rubbers and polyunsaturated rubbers.

10. A bound antioxidant polymer masterbatch concentrate capable of being blended with an unmodified polymer, said masterbatch concentrate comprising a starting polymer selected from the group consisting of polyolefins, vinyl chloride polymers, polystyrene, polyamides, ethylene-propylene copolymers and terpolymers, rubber-modified plastics, thermoplastic rubbers and polyunsaturated rubbers which has been subjected to graft polymerisation by reaction in the melt in the presence of free radicals at a temperature of 100° C. to 350° C. with an amount sufficient to provide per 100 g of bound antioxidant polymer masterbatch concentrate from 2 to 50 g of at least one antioxidant selected from bis-acrylic esters, bis-alkylacrylic esters, bis-acrylic amides, and bis-alkylacrylic amides having the structure

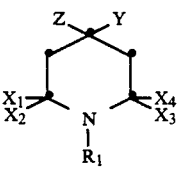

where Y represents

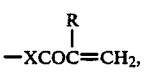

$R_1$ represents

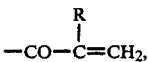

Z represents H, OR, NHR, $NR_2$, COOH or $CH_2COOH$, each R, which can be the same or different, represents H or alkyl, X represents —O— or —NH—, and each of $X_1$, $X_2$, $X_3$ and $X_4$, which can be the same or different, represents alkyl, said free radicals having been produced by shearing and/or by the presence of a radical generator in a molar ratio of said radical generator to said antioxidant of from 0.001:1 to 1:1, and the reaction having been continued for a time such that the melt viscosity of the polymer which increases initially during the reaction has reduced to a level which permits the concentrate to be homogeneously blended into said unmodified polymer.

11. A stabilized polymer comprising a blend of an unmodified polymer with from 0.01 to 5% by weight of a bound antioxidant polymer masterbatch concentrate, said masterbatch concentrate comprising a starting polymer selected from the group consisting of polyolefins, vinyl chloride polymers, polystyrene, polyamides, ethylenepropylene copolymers and the terpolymers, rubber-modified plastics, thermoplastic rubbers and polyunsaturated rubbers which has been subjected to graft polymerization by reaction in the melt in the presence of free radicals at a temperature of 100° C. to 350° C. with sufficient to provide per 100 g of bound antioxidant polymer masterbatch concentrate from 2 to 50 g of at least one antioxidant selected from bis-acrylic esters, bis-alkylacrylic esters, bis-acrylic amides, and bis-alkylacrylic amdies having the structure

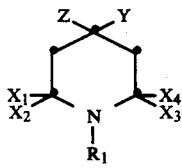

where Y represents

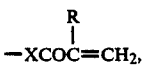

represents

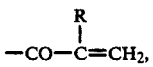

Z represents H, OR, NHR, $NR_2$, COOH or $CH_2COOH$, each R, which can be thes ame or different, represents H or alkyl, X represents —O— or —NH—, and each of $X_1$, $X_2$, $X_3$ and $X_4$, which can be the same or different, represents alkyl, said free radicals having been produced by shearing and/or by the presence of a radical generator in a molar ratio of said radical generator to said antioxidant of from 0.001:1 to 1:1, and the reaction having been continued for a time such that the melt viscosity of the polymer which increases initially during the reaction has reduced to a level which permits the concentrate to be homogeneously blended into said unmodified polymer.

* * * * *